United States Patent [19]
Yanagisawa

[11] Patent Number: 5,804,932
[45] Date of Patent: Sep. 8, 1998

[54] DRIVE SYSTEM

[76] Inventor: Ken Yanagisawa, c/o Kabushiki Kaisha Mechanic Sekkei Jimusho 5175-1, Ooaza Toyoshina, Toyoshina-machi, Minamiazumi-gun, Nagano-ken, Japan

[21] Appl. No.: 685,865

[22] Filed: Jul. 24, 1996

[30] Foreign Application Priority Data

Jul. 27, 1995 [JP] Japan .................................. 7-191882

[51] Int. Cl.⁶ ............................ B25J 15/04; B65H 59/20
[52] U.S. Cl. ............................ 318/6; 74/89.22; 108/143
[58] Field of Search ..................... 318/6; 33/1 M; 74/89, 89.15, 89.2, 89.21, 89.22, 471; 108/143; 414/749; 901/16

[56] References Cited

U.S. PATENT DOCUMENTS 3,926,061  12/1975  Paulson .
4,544,061  10/1985  Crandall .
5,311,790   5/1994  Yanagisawa .

FOREIGN PATENT DOCUMENTS 5-31683  2/1993  Japan .

Primary Examiner—Bentsu Ro
Attorney, Agent, or Firm—Birch, Stewart, Kolasch & Birch, LLP

[57] ABSTRACT

An object of the present invention is to provide a drive system having a simple structure, which is capable of synchronously moving travellers, having high positioning accuracy and reducing the manufacturing cost and operating noise. A pair of guides are provided on a base in a first direction. A pair of travellers are capable of moving in the first direction alongside the guides. A first rotary guide is provided to one of the travellers. A second rotary guide is provided to the other traveller. A first tension member is tensionally engaged with the rotary guides, one end section is extended from the first rotary guide and fixed to the base, the other end is extended from the second rotary guide in the opposite direction and fixed to the base. A second tension member is tensionally engaged with the rotary guides, one end section is extended from the first rotary guide in the opposite direction to the one end section of the first tension member and fixed to the base, the other end section is extended from the second rotary guide in the opposite direction to the one end section and fixed to the base.

20 Claims, 9 Drawing Sheets

FIG. 14

DRIVE SYSTEM

BACKGROUND OF THE INVENTION

The present invention relates to a drive system, more precisely relates to a drive system having: a guide being provided on a base and arranged in a first direction; a traveller being capable of moving in the first direction alongside the guide; and a drive unit for moving the traveller in the first direction.

One of conventional drive systems, which includes the guides, the travellers moving alongside the guides and the drive unit for moving the travellers, is disclosed in Japanese Patent Kokai Gazette No. 5-31683 (U.S. Pat. No. 5,311,790).

Figure 15:
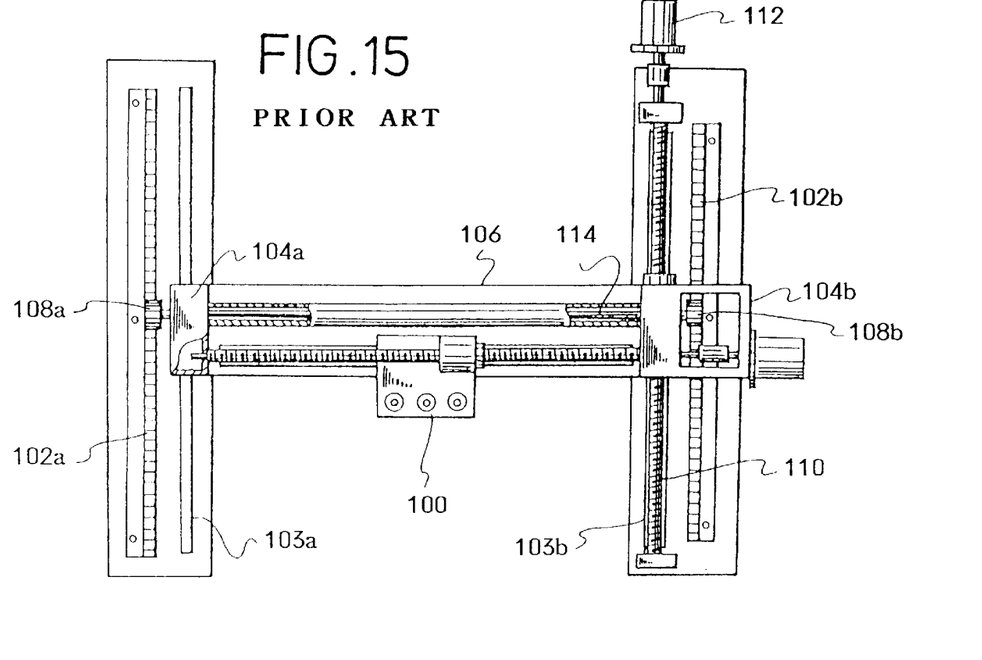
FIG. 15 is a plan view of the conventional drive system.

As shown in FIG. 15, the conventional drive system has:

a moving body 100;

a pair of racks 102a and 102b being arranged parallel;

a pair of travellers 104a and 104b being capable of moving alongside the racks 102a and 102b;

a connecting member 106, to which the moving body 100 is attached, mutually connecting the travellers 104a and 104b;

a pair of pinion gears 108a and 108b being rotatably attached to the travellers 104a and 104b and respectively engaging with the racks 102a and 102b;

a ball bearing screw 110 being rotatably arranged parallel to the racks and screwed with the traveller 104b; and a motor 112 for rotating the ball bearing screw 110.

Note that, the pinion gears 108a and 108b are respectively fixed to each end of a shaft 114, which is rotatably provided to the connecting member 106.

In the conventional drive system, the ball bearing screw 110 is rotated by the motor 112. The traveller 104b is directly moved by driving force of the ball bearing screw 110; the other traveller 104a is synchronously moved by the pinion gears 108a and 108b and the shaft 114. Since the pinion gears 108a and 108b are engaged with the racks 102a and 102b, the pinion gear 108b is rotated with the movement of the traveller 104b, so that the pinion gear 108a is also rotated with the shaft 114. With this rotation, the traveller 104a, to which the pinion gear 108a is provided, can be moved synchronously.

During the operation, bending moment working to the connecting member 106 can be converted into twisting moment in the shaft 114. With this conversion, the travellers 104a and 104b can be synchronously moved and performance of the drive system can be improved without increasing weight of the connecting member 106. And, since the travellers 104a and 104b can be moved synchronously, the travellers 104a and 104b and a work piece, etc., which are attached to the travellers 104a and 104b, can be positioned precisely.

The positioning accuracy of the drive system depends on the accuracy of the ball bearing screw 110, so it can be very higher.

However, the conventional drive system has following disadvantages.

The drive system has the racks 102a and 102b and the pinion gears 108a and 108b, which are respectively fixed to each end of the shaft 114. Since the racks 102a and 102b and the pinion gears 108a and 108b are precision parts, so the structure of the system must be complex, and manufacturing cost thereof must be high.

In the case of manufacturing a large size system, it is very difficult to precisely lay the long racks 102a and 102b.

Further, since the pinion gears 108a and 108b are engaged with the racks 102a and 102b, noise must be generated when the pinion gears 108a and 108b are rotated.

SUMMARY OF THE INVENTION

An object of the present invention is to provide a drive system having a simple structure, which is capable of synchronously moving travellers.

An object of the present invention is to provide a drive system having high positioning accuracy.

An object of the present invention is to provide a drive system, which is capable of reducing the manufacturing cost and operating noise.

To achieve the objects, the drive system of the present invention having following structures.

A first basic structure of the present invention comprises:

a pair of guides being provided on a base, the guides being arranged in a first direction;

a pair of travellers being capable of moving in the first direction alongside the guides;

a first rotary guide being provided to one of the travellers;

a second rotary guide being provided to the other traveller;

a first tension member being tensionally engaged with the first rotary guide and the second rotary guide, one end section of the first tension member being extended from the first rotary guide and fixed to the base, the other end section thereof being extended from the second rotary guide in the opposite direction to the one end section and fixed to the base;

a second tension member being tensionally engaged with the first rotary guide and the second rotary guide, one end section of the second tension member being extended from the first rotary guide in the opposite direction to the one end section of the first tension member and fixed to the base, the other end section thereof being extended from the second rotary guide in the opposite direction to the one end section thereof and fixed to the base; and a drive unit for moving the travellers in the first direction.

The first basic structure may further comprise a connecting member mutually connecting said pair of guides.

And a second basic structure of the present invention comprises:

a pair of first guides being provided on a base, the first guides being arranged in a first direction;

a pair of first travellers being capable of moving in the first direction alongside the first guides;

a first connecting member mutually connecting the pair of first travellers;

a first rotary guide being provided to one of the travellers;

a second rotary guide being provided to the other traveller;

a first tension member being tensionally engaged with the first rotary guide and the second rotary guide, one end section of the first tension member being extended from the first rotary guide and fixed to the base, the other end section thereof being extended from the second rotary guide in the opposite direction to the one end section and fixed to the base;

a second tension member being tensionally engaged with the first rotary guide and the second rotary guide, one end section of the second tension member being extended from the first rotary guide in the opposite direction to the one end section of the first tension member and fixed to the base, the other end section thereof being extended from the second rotary guide in the opposite direction to the one end section thereof and fixed to the base;

a first drive unit for moving the first travellers in the first direction;

a pair of second guides being provided on the base, the first guides being arranged in a second direction perpendicular to the first direction;

a pair of second travellers being capable of moving in the second direction alongside the second guides;

a second connecting member mutually connecting the pair of second travellers;

a third rotary guide being provided to one of the second travellers;

a fourth rotary guide being provided to the other second traveller;

a third tension member being tensionally engaged with the third rotary guide and the fourth rotary guide, one end section of the third tension member being extended from the third rotary guide and fixed to the base, the other end section thereof being extended from the fourth rotary guide in the opposite direction to the one end section and fixed to the base;

a fourth tension member being tensionally engaged with the third rotary guide and the fourth rotary guide, one end section of the fourth tension member being extended from the third rotary guide in the opposite direction to the one end section of the third tension member and fixed to the base, the other end section thereof being extended from the fourth rotary guide in the opposite direction to the one end section thereof and fixed to the base;

a second drive unit for moving the second travellers in the second direction; and a moving body being capable of moving on the first connecting member and the second connecting member.

Further, a third basic structure of the present invention comprises:

a guide being provided on a base, the guide being arranged in a first direction;

an elongated traveller being arranged in a second direction perpendicular to the first direction, the traveller being capable of moving in the first direction alongside the guide;

a first rotary guide being provided to one part of the traveller;

a second rotary guide being provided to another part of the traveller;

a first tension member being tensionally engaged with the first rotary guide and the second rotary guide, one end section of the first tension member being extended from the first rotary guide and fixed to the base, the other end section thereof being extended from the second rotary guide in the opposite direction to the one end section and fixed to the base;

a second tension member being tensionally engaged with the first rotary guide and the second rotary guide, one end section of the second tension member being extended from the first rotary guide in the opposite direction to the one end section of the first tension member and fixed to the base, the other end section thereof being extended from the second rotary guide in the opposite direction to the one end section thereof and fixed to the base; and a drive unit for moving the traveller in the first direction.

In each basic structure of the present invention, the drive unit may include a ball bearing screw, which is screwed with one of the travellers, or rotary driving means, which rotates one of the rotary guides.

In the drive system of the present invention, the first tension member and the second tension member are tensionally engaged with the rotary guides to bias the rotary guides in the opposite directions. And the end sections of the first tension member and the second tension member are mutually extended in the opposite directions and fixed. With these structures, when one traveller is moved, the other traveller is synchronously moved with the one traveller in the same direction. Namely, the tension of the first tension member and the second tension member removes the bending moment between the travellers, so that the travellers can be moved synchronously. Note that, the third tension member and the fourth tension member in the second basic structure have the same function.

Even if the travellers are moved, the state of biasing the rotary guides, in the opposite directions, by the first tension member and the second tension member is always kept. Thus, play in the travellers can be removed, so that they can be positioned with higher accuracy.

The travellers can be synchronized, without the racks and the pinion gears, by simple means: the rotary guides and the tension members, so that the manufacturing cost of the drive system can be reduced.

Further, operating noise of the drive system can be lower than that of the conventional drive system having the racks and the pinion gears.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

(First Embodiment)

Figure 1:
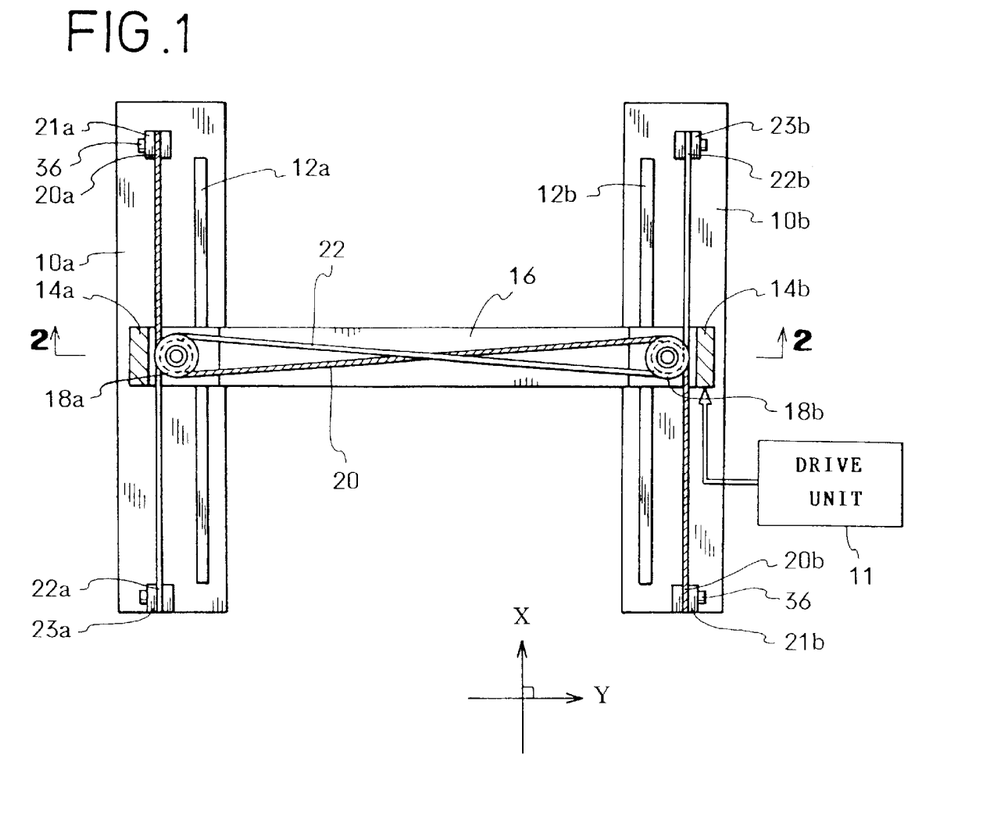
FIG. 1 is a plan view of the drive system of First Embodiment of the present invention.
Figure 2:
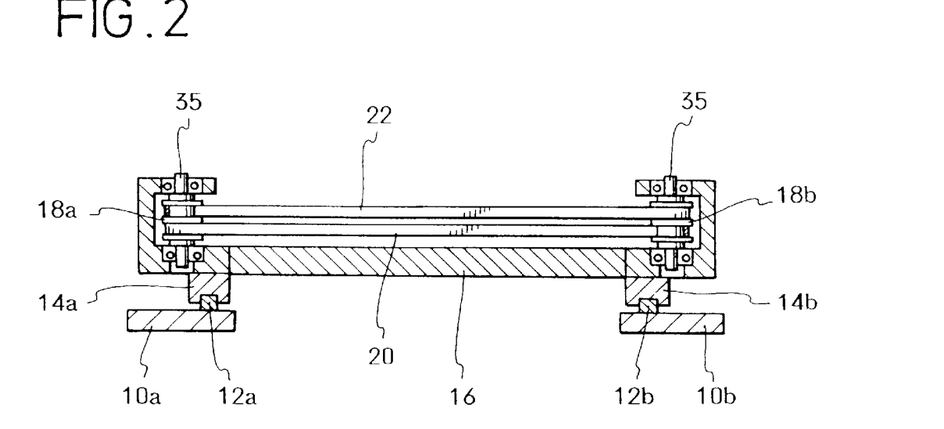
FIG. 2 is a sectional view taken along a line 2—2 in FIG. 1.
Figure 3:
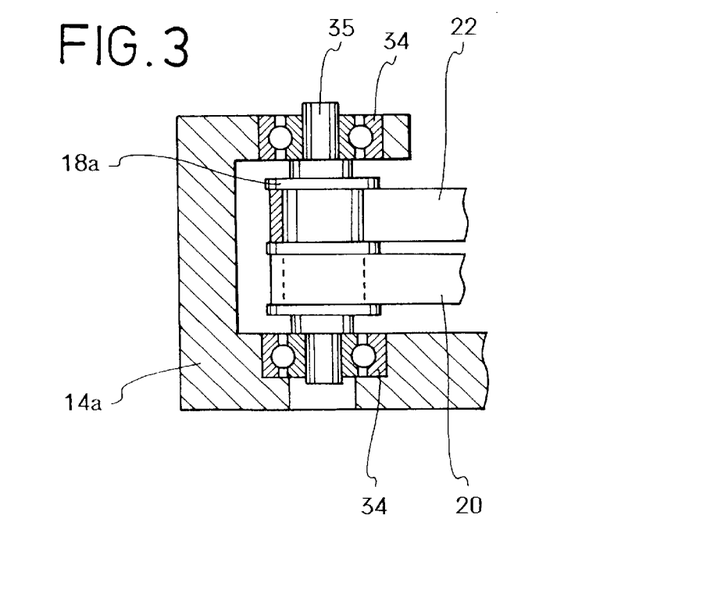
FIG. 3 is a sectional view in the vicinity of a pulley of the First Embodiment.

First Embodiment will be explained with reference to FIG. 1 (a plan view), FIG. 2 (a sectional view taken along a line 2—2) and FIG. 3 (a sectional view in the vicinity of a pulley).

Two bases 10a and 10b constitute a base section of the drive system. A pair of X-guides 12a and 12b, which are arranged in a first direction, e.g., an X-direction, are respectively provided on the bases 10a and 10b. The X-guides 12a and 12b are parallel rails.

A pair of X-travellers 14a and 14b are capable of moving in the X-direction alongside the X-guides 12a and 12b. The X-travellers 14a and 14b are slidably fitted with the X-guides 12a and 12b, so that they can slide, in the X-direction, on the X-guides 12a and 12b. To disassemble the X-travellers 14a and 14b from the X-guides 12a and 12b, they are mutually fitted by, for example, dove tail structures.

An X-connecting member 16 connects the X-travellers 14a and 14b. The X-connecting member 16 is not limited to a beam shown, so a rod, a pipe, etc. can be employed instead of the beam.

A pair of pulleys 18a and 18b are respectively provided to each X-traveller 14a and 14b. The pulley 18a acts as a first rotary guide; the pulley 18b acts as a second rotary guide. As shown in FIG. 3, the pulleys 18a and 18b are respectively fixed to rotary shafts 35, each of which is rotatably attached to each X-traveller 14a and 14b with bearings 34. Thus, the pulleys 18a and 18b are capable of rotating together with the rotary shafts 35. The pulleys 18a and 18b are double pulleys, in which a first belt 20 is engaged in lower parts and a second belt 22 is engaged in upper parts. Note that, in the present embodiment, the pulleys 18a and 18b are the double pulleys, but the upper part and the lower part of each pulley 18a and 18b may rotate independently.

The first belt 20 is an example of a first tension member. Mid sections of the first belt 20 are diagonally engaged with the pulleys 18a and 18b. End sections of the first belt 20 are mutually extended in the opposite directions from the pulleys 18a and 18b. Tension is applied to the first belt 20, and the ends thereof are fixed to the bases 10a and 10b. Namely, in FIG. 1, the first belt 20 is tensionally engaged with a lower-left part of the pulley 18a and an upper-right part of the pulley 18b, so that it is formed into a Z-shape. One end section 20a of the first belt 20 is fixed to a fixing section 21a, which is provided at an upper end of the base 10a; the other end section 20b of the first belt 20 is fixed to a fixing section 21b, which is provided at a lower end of the base 10b. Note that, a part of the first belt 20 between the one end 20a and the pulley 18a and another part of the first belt 20 between the other end 20b and the pulley 18b are arranged parallel to the X-guides 12a and 12b.

The second belt 22 is an example of a second tension member. Mid sections of the second belt 22 are diagonally engaged with the pulleys 18a and 18b. End sections of the second belt 22 are mutually extended in the opposite directions from the pulleys 18a and 18b. Tension is applied to the second belt 22, and the ends thereof are fixed to the bases 10a and 10b. Namely, in FIG. 1, the second belt 22 is tensionally engaged with an upper-left part of the pulley 18a and a lower-right part of the pulley 18b, so that it is formed into a Z-shape. One end section 22a of the second belt 22 is fixed to a fixing section 23a, which is provided at a lower end of the base 10a; the other end section 22b of the second belt 22 is fixed to a fixing section 23b, which is provided at an upper end of the base 10b. Note that, a part of the second belt 22 between the one end 22a and the pulley 18a and another part of the second belt 22 between the other end 22b and the pulley 18b are also arranged parallel to the X-guides 12a and 12b.

In the present embodiment, the belts 20 and 22 are used as the first and the second tension members, but other tensionable members, e.g., timing belts, chains, wires, which are capable of tensionally engaging with the first and the second rotary guides, may be used as the tension members. In the case of using the timing belts as the tension members, timing pulleys are used as the rotary guides. In the case of using the chains as the tension members, sprockets are used as the rotary guides. Note that, in the case of using the wires or ropes as the tension members, the rotary guides need not rotate; they are required to guide and slip the wires or ropes.

The fixing sections 21a and 21b are capable of not only fixing the ends 20a and 20b of the first belt 20 but also adjusting the tension thereof. On the other hand, the fixing sections 23a and 23b are capable of not only fixing the ends 22a and 22b of the second belt 22 but also adjusting the tension thereof. As shown in FIG. 1, the fixing sections 21a, 21b, 23a and 23b respectively have, for example, bolts 36 which fix each end of the first belt 20 and the second belt 22. The tension is applied to the first belt 20 and the second belt 22 by, for example, pulling the belts when the belts are fixed to the bases, connecting springs to each end of the belts, etc. The tension may be adjusted according to change of weight load so as to properly synchronize the movement of the travellers 14a and 14b. The tension of the first belt 20 and the second belt 22 are usually made equal; the tension of the both belts may be different when the weight load of one of the travellers 14a and 14b is greater than that of the other.

In the present embodiment, the fixing sections 21a, 21b, 23a and 23b are respectively provided to each end of the bases, but the end sections of the belts may be optionally fixed at any positions in the bases.

In the present embodiment, the pulleys 18a and 18b are arranged in a Y-direction perpendicular to the X-direction with a separation, but they may be arranged in a direction diagonally crossing the X-direction.

Further, in the present embodiment, the belts 20 and 22 are merely engaged with the pulleys 18a and 18b, but they may be wound around the pulleys 18a and 18b once or more. With this structure, disengaging the tension members from the rotary guides can be prevented.

In the drive system of the present embodiment, many kinds of driving means can be employed as a drive unit 11. For example, a ball bearing screw 24 shown in FIG. 4, which is driven by a servo motor 28, or a servo motor 28 shown in FIG. 7, which rotates the pulley 18b, directly moves at least one of the X-travellers 14a and 14b in the X-direction as the drive unit, so that the X-travellers 14a and 14b can be synchronously moved by the above described structure.

The drive unit 11 may directly move the both X-travellers 14a and 14b in the X-direction, and it may directly move the X-connecting member 16 in the X-direction. Namely, the drive unit 11 is required to move at least one of movable members, which can be moved in the X-direction, including the X-travellers 14a and 14b. The X-travellers 14a and 14b can be synchronously moved, without reference to the structure of the drive unit 11, by the tension of the first belt 20 and the second belt 22.

(Second Embodiment)

Figure 4:
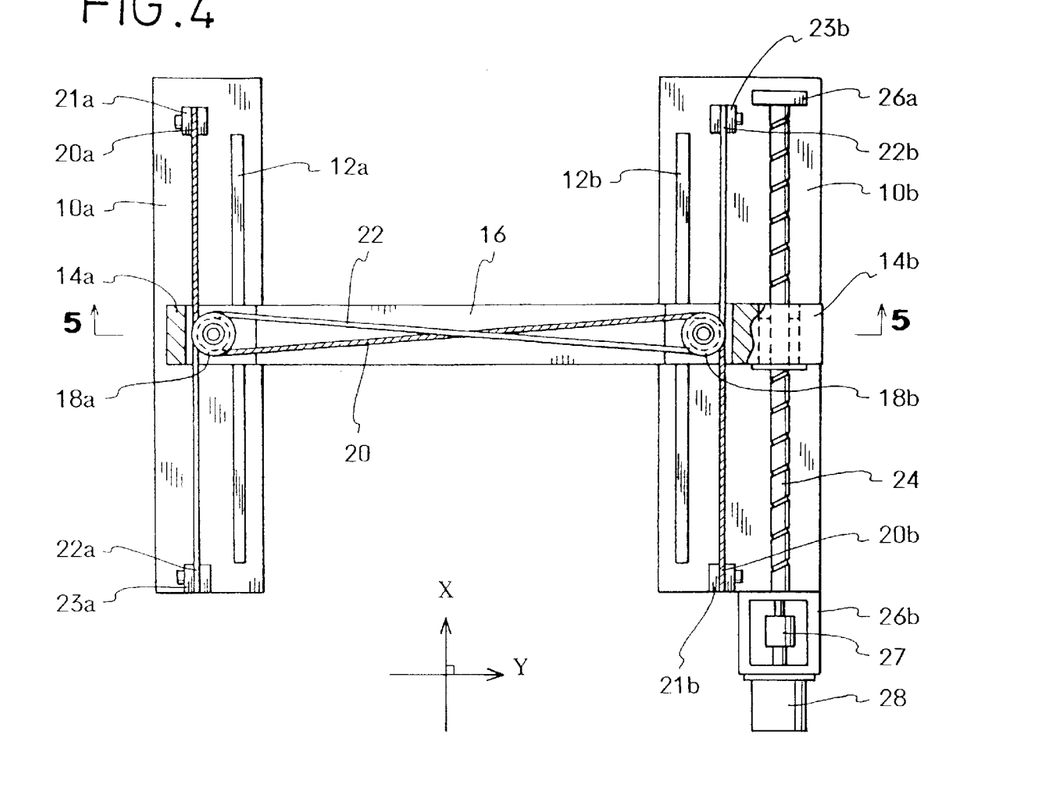
FIG. 4 is a plan view of the drive system of Second Embodiment.
Figure 5:
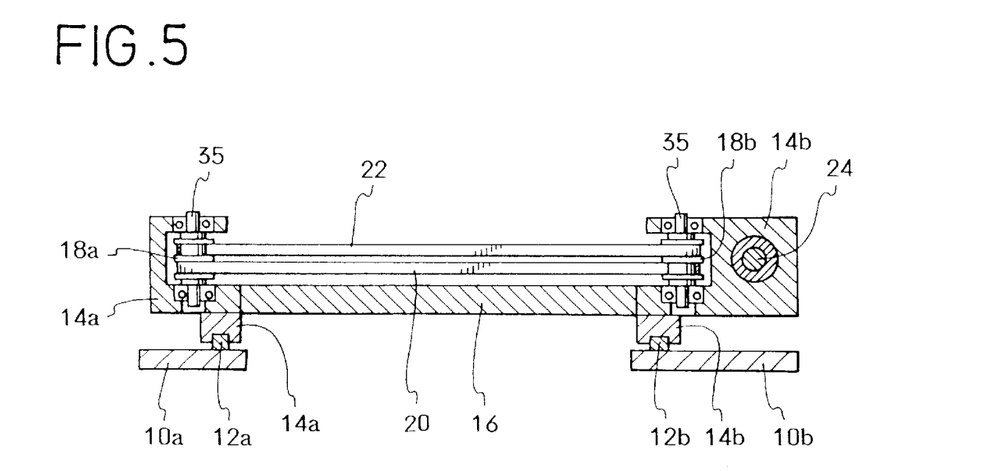
FIG. 5 is a sectional view taken along a line 5—5 in FIG. 4.

Second Embodiment, in which an concrete example of the drive unit 11 is provided to the drive system of the First Embodiment, will be explained with reference to FIG. 4 (a plan view) and FIG. 5 (a sectional view taken along a line 5—5).

In the present embodiment, the drive unit includes a ball bearing screw. Note that, elements which have been explained in the First Embodiment are assigned the same symbols, and explanation will be omitted.

An X-ball bearing screw 24 is arranged in the X-direction. The X-ball bearing screw 24 is capable of rotating about its own axis, and it is rotatably held between supporting members 26a and 26b, which are fixed on the base 10b. The X-ball bearing screw 24 is screwed with the X-traveller 14b. Since a rotational position of the X-ball bearing screw 24 can be kept while stopping the rotation, unwilling shift or movement of the X-travellers 14a and 14b can be prevented.

A servo motor 28 constitutes the drive unit. The servo motor 28 rotates the X-ball bearing screw 24. The servo motor 28 and the X-ball bearing screw 24 are connected by a coupler 27. The rotation of the X-ball bearing screw 24 can be controlled by controlling rotational speed, rotational direction and rotational angle of the servo motor 28.

While the X-ball bearing screw 24 is rotated, the X-travellers 14a and 14b, which are connected by the X-connecting member 16, are synchronously moved, in the X-direction, on the X-guides 12a and 12b. Even if the X-travellers 14a and 14b are moved, the state of pulling the pulleys 18a and 18b in the opposite directions is always kept by the first belt 20 and the second belt 22, so that the X-travellers 14a and 14b can be moved synchronously.

Since the pulleys 18a and 18b are pulled in the opposite directions by the first belt 20 and the second belt 22, play of the X-travellers 14a and 14b can be removed. Thus, the X-travellers 14a and 14b and a member or members, which are attached to the X-travellers 14a and 14b, can be positioned with high accuracy.

(Third Embodiment)

Figure 6:
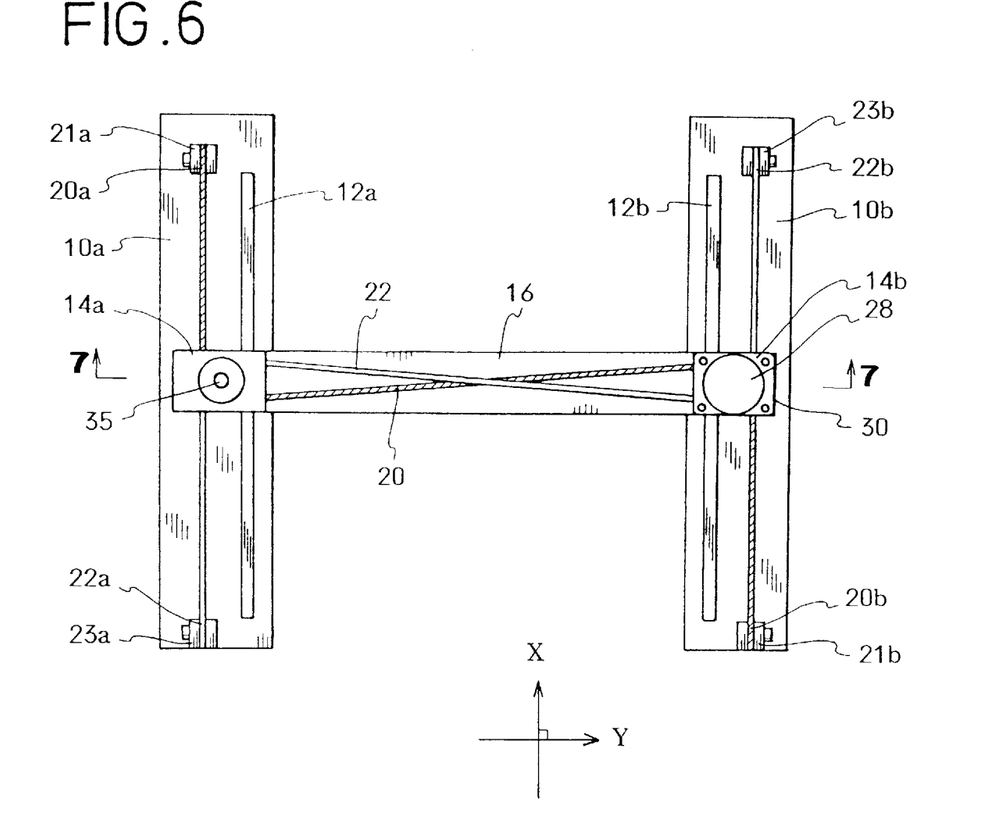
FIG. 6 is a plan view of the drive system of Third Embodiment.
Figure 7:
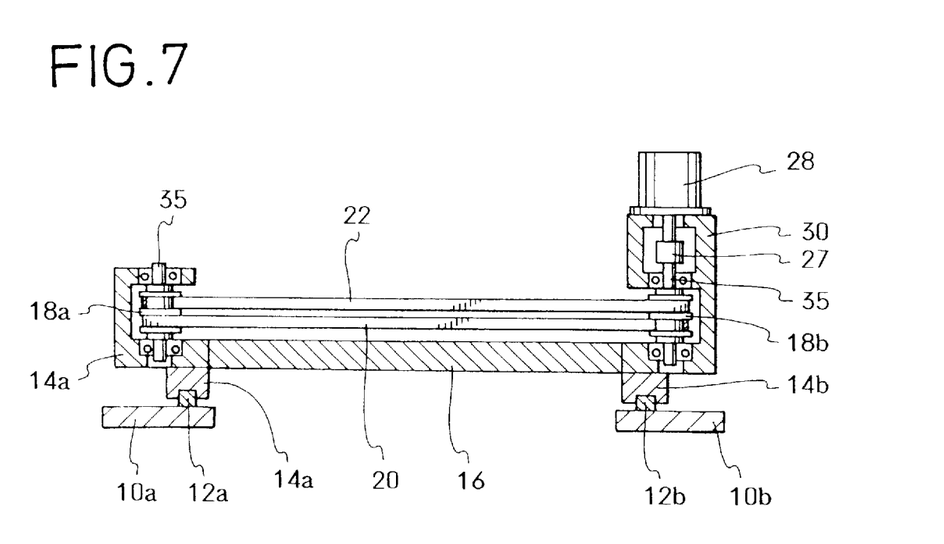
FIG. 7 is a sectional view taken along a line 7—7 in FIG. 6.

Third Embodiment will be explained with reference to FIG. 6 (a plan view) and FIG. 7 (a sectional view taken along a line 7—7). In the Third Embodiment, a rotary drive unit is employed as the drive unit 11. Note that, elements which have been explained in the First Embodiment are assigned the same symbols, and explanation will be omitted.

A servo motor 28, which is an example of the rotary drive unit, is provided on a holding section 30, which is fixed to the X-traveller 14b. The rotary shaft 35 of the pulley 18b is connected to the servo motor 28 by a coupler 27. The rotation of the pulley 18b can be controlled by controling rotational speed, rotational direction and rotational angle of the servo motor 28. Note that, the pulley 18b and the servo motor 28 may be connected with a reduction gear mechanism.

When the servo motor 28 rotates the pulley 18b, the pulleys 18a and 18b are rolled on the first belt 28 and the second belt 22. For example, if the pulley 18b is rotated in the clockwise direction, the X-traveller 14b is moved upward in FIG. 6. Then a parallel part of the first belt 20 which is parallel to the X-guide 12b is made long; a parallel part of the second belt 22 which is parallel to the X-guide 12b is made short. At that time, the pulley 18a is rotated in the counterclockwise direction. So a parallel part of the first belt 20 which is parallel to the X-guide 12a is made short; a parallel part of the second belt 22 which is parallel to the X-guide 12a is made long. Thus, the X-travellers 14a and 14b are synchronously slid upward on the X-guides 12a and 12b with high accuracy. On the other hand, to move the X-travellers 14a and 14b downward, the pulley 18b is rotated in the counterclockwise direction, so that the pulley is rotated in the clockwise direction and the X-travellers 14a and 14b are synchronously moved downward with high accuracy.

(Fourth Embodiment)

Figure 8:
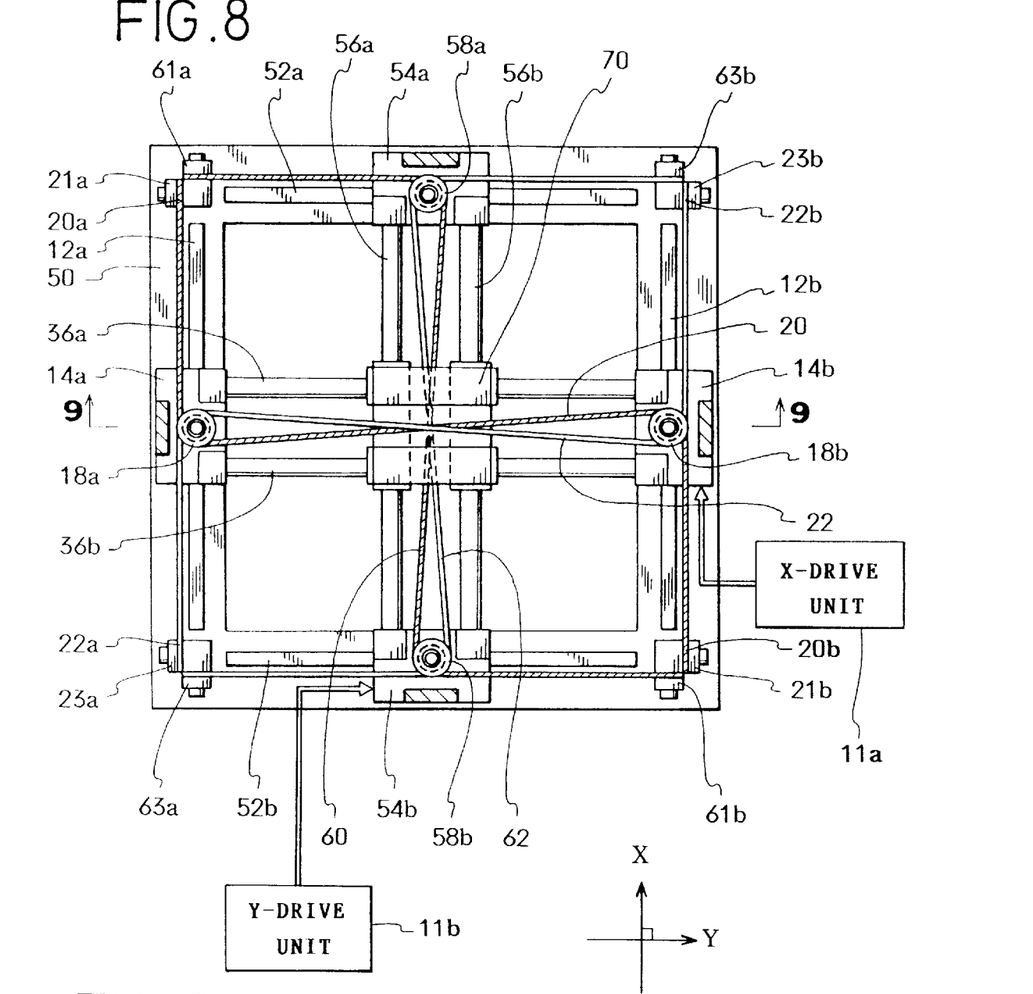
FIG. 8 is a plan view of the drive system of Fourth Embodiment.
Figure 9:
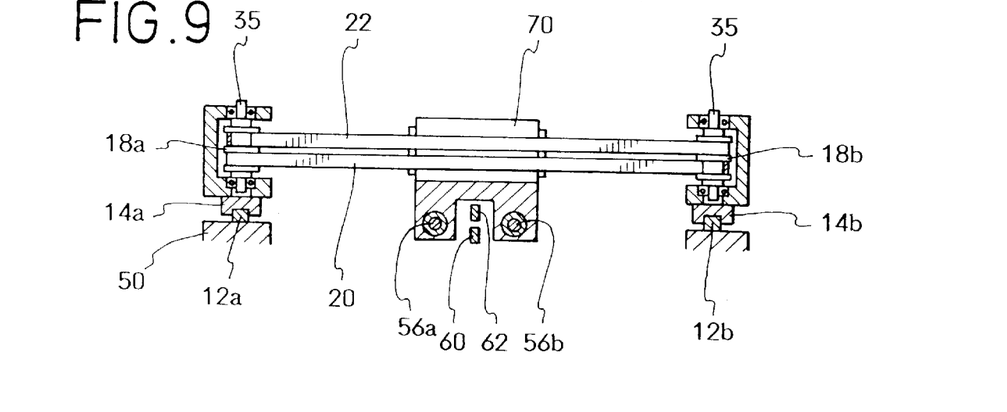
FIG. 9 is a sectional view taken along a line 9—9 in FIG. 8.

Fourth Embodiment will be explained with reference to FIG. 8 (a plan view) and FIG. 9 (a sectional view taken along a line 9—9). Note that, elements which have been explained in the First Embodiment are assigned the same symbols, and explanation will be omitted.

Structures for the movement in the X-direction are almost the same as those of the First Embodiment except a base 50 and a pair of X-rods 36a and 36b which act as a first connecting member. The base 50 is formed into a frame having a center air space. Each end of the X-rods 36a and 36b is fixed to a pair of the X-travellers (first travellers) 14a and 14b. Note that, in the present embodiment, a pair of X-rods are provided, but its number may be one, or three or more, further its shape may be formed into, for example, a pipe shape.

In the present embodiment, the X-guides 12a and 12b explained in the First Embodiment act as first guides, and the X-drive unit 11a acts as a first drive unit.

Successively, structures for the movement in the Y-direction (a second direction) will be explained. The structures for the movement in the Y-direction are almost the same as those for the movement in the X-direction, so details will be omitted.

A pair of Y-guides (second guides) 52a and 52b are arranged, in the Y-direction perpendicular to the X-direction, on the base 50.

A pair of Y-travellers (second travellers) 54a and 54b are capable of moving, in the Y-direction, alongside the Y-travellers 52a and 52b.

A pair of Y-rods (second connecting members) 56a and 56b connect the Y-travellers 54a and 54b. Note that, in the present embodiment, a pair of Y-rods are provided, but its number may be one, or three or more, further its shape may be formed into, for example, a pipe shape.

The pulleys 58a and 58b, which are respectively act as a third rotary guide and a fourth rotary guide, are respectively provided to the Y-travellers 54a and 54b. The pulleys 58a and 58b are double pulleys, in which a third belt (a third tension member) 26 is engaged in lower parts and a fourth belt (a fourth tension member) 62 is engaged in upper parts.

Mid sections of the third belt 60 are diagonally engaged with the pulleys 58a and 58b, and end sections thereof are mutually extended in the opposite directions. Tension is applied to the third belt 60, and the ends thereof are fixed to the base 50.

Mid sections of the fourth belt 62 are diagonally engaged with the pulleys 58a and 58b to bias the both against the tension of the third belt 60, and end sections thereof are mutually extended in the opposite directions. Tension is applied to the fourth belt 62, and the ends thereof are fixed to the base 50.

Fixing sections 61a and 61b adjust the tension of the third belt 60 and fix its ends. Fixing sections 63a and 63b adjust the tension of the fourth belt 62 and fix its ends.

The X-rods 36a and 36b and the Y-rods 56a and 56b are pierced through a moving body 70 and mutually crossed therein. The moving body 70 is capable of moving, in the Y-direction, on the X-rods 36a and 36b and moving, in the X-direction, on the Y-rods 56a and 56b. Note that, the moving body 70 is formed into a cubical block. There is formed an upper groove, through which the first belt 20 and the second belt 22 run, in an upper face of the moving body 70; there is formed a lower groove, through which the third belt 60 and the fourth belt 62 run, in a bottom face thereof.

There are bored a pair of through-holes, through which the X-rods 36a and 36b are pierced, in the Y-direction, in an upper part of the moving body 70; there are bored a pair of through-holes, through which the Y-rods 56a and 56b are pierced, in the X-direction, in a lower part thereof. Robot heads for machining, tools, work pieces, etc. can be mounted on the moving body 70.

In the drive system of the present embodiment, the moving body 70 can be moved by the X-drive unit 11a for moving the X-travellers in the X-direction and a Y-drive unit (a second drive unit) 11b for moving the Y-travellers in the Y-direction, so that the moving body 70 can be two-dimensionally moved in the X- and the Y-directions with high accuracy.

Many types of mechanisms can be employed as the X-drive unit 11a and the Y-drive unit 11b as well as the drive unit 11 of the First Embodiment. For example, the Y-travellers 54a and 54b can be synchronously moved by the Y-drive unit 11a which is capable of directly moving at least one of the Y-travellers 54a and 54b.

The Y-drive unit 11b may directly move the both Y-travellers 54a and 54b in the Y-direction, and it may directly move the Y-rods 56a and 56b in the Y-direction. Namely, the Y-drive unit 11b directly moves at least one of movable members in the Y-direction. The Y-travellers 54a and 54b can be synchronously moved by the tension of the third belt 60 and the fourth belt 62 as well as the First Embodiment.

The X-drive unit 11a and the Y-drive unit 11b may directly move the moving body 70 in the X- and the Y-directions. Namely, when the moving body 70 is moved, the movement of the X-travellers 14a and 14b in the X-direction are synchronized by the tension of the first belt 20 and the second belt 22; the movement of the Y-travellers 54a and 54b in the Y-direction are synchronized by the tension of the third belt 60 and the fourth belt 62. With this structure, the moving body 70 can be moved with high accuracy.

(Fifth Embodiment)

Figure 10:
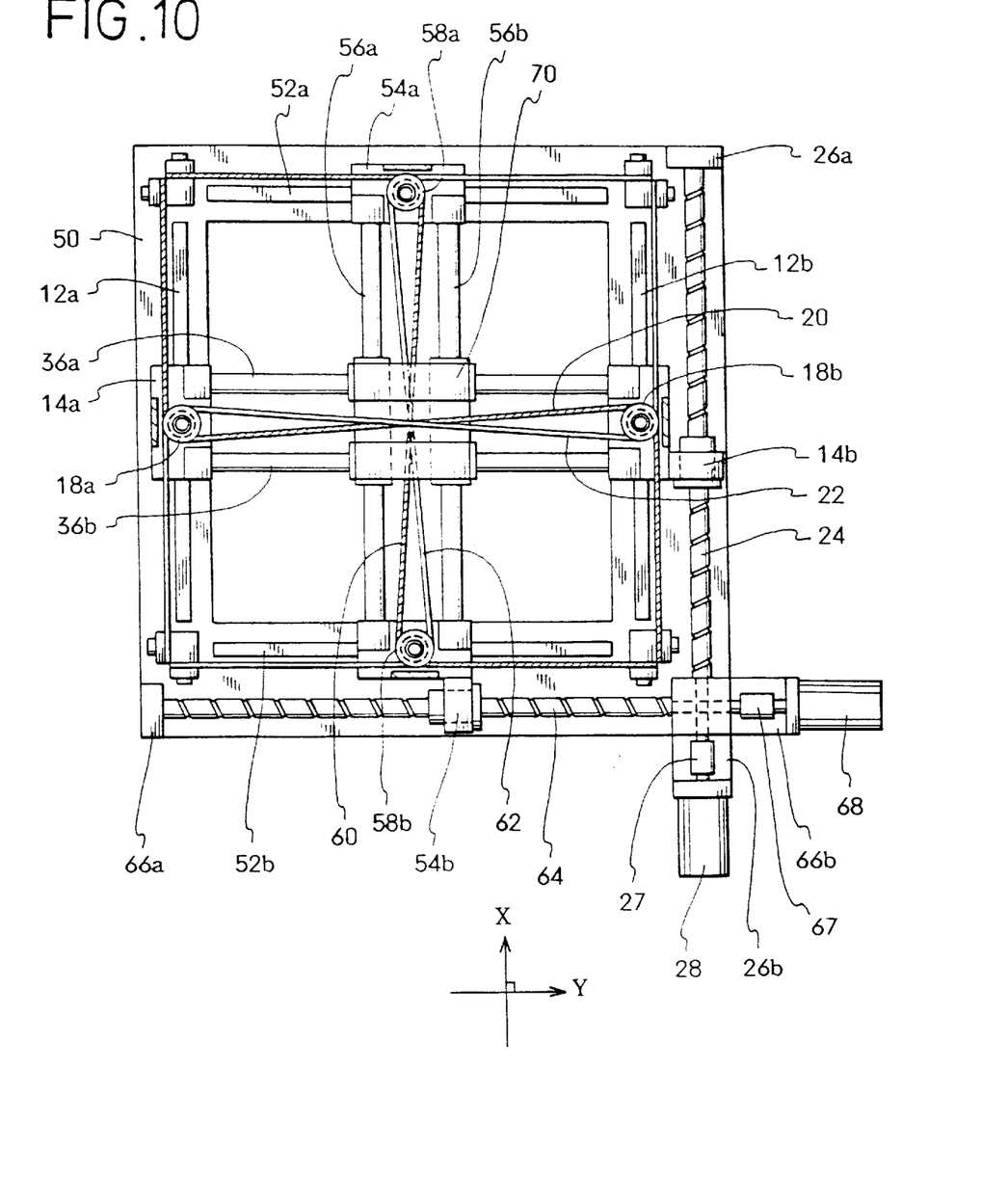
FIG. 10 is a plan view of the drive system of Fifth Embodiment.

Fifth Embodiment will be explained with reference to FIG. 10 (a plan view). In the Fifth Embodiment, the X- and the Y-drive units 11a and 11b, which have been explained in the Fourth Embodiment, include ball bearing screws.

The X-drive unit of the Fifth Embodiment is the same as the X-drive unit of the Second Embodiment, so elements which have been explained in the Second Embodiment are assigned the same symbols, and explanation will be omitted.

When the X-ball bearing screw 24 is rotated, the X-travellers 14a and 14b, which have been connected by the X-rods 36a and 36b which are an example of a first connecting member, are synchronously moved, in the X-direction, alongside the X-guides 12a and 12b.

The structure of the Y-drive unit is the same as that of the X-drive unit except the direction of arrangement, so its detail action is omitted.

The Y-ball bearing screw 64 is arranged in the Y-direction. The Y-ball bearing screw 64 is capable of rotating about its own axis. The Y-ball bearing screw 64 is rotatably held between holding members 66a and 66b, which are fixed on the base 50. The Y-ball bearing screw 64 is screwed with the Y-traveller 54b.

A servo motor 68 rotates the Y-ball bearing screw 64. The servo motor 68 and the Y-ball bearing screw 64 are connected by a coupler 67.

When the Y-ball bearing screw 64 is rotated, the Y-travellers 54a and 54b, which have been connected by the Y-rods 56a and 56b which are an example of a second connecting member, are synchronously moved, in the Y-direction, alongside the Y-guides 52a and 52b.

Since the drive system is capable of synchronously moving each pair of the X-travellers 14a and 14b and the Y-travellers 54a and 54b, motility of the moving body 70 can be improved, and the moving body 70 can be two-dimensionally moved in the X- and the Y-directions with high accuracy.

Play in the drive system can be removed by the tension of the tension members, so positioning accuracy of the moving body 70 can be high.

Since the drive units include the X-ball bearing screw 24 and the Y-ball bearing screw 64, the positioning accuracy can be quite higher.

Further, the X-rods, the Y-rods and the moving body 70 are held by four sides of the drive system, so the moving body 70 can be moved stably.

(Sixth Embodiment)

Figure 11:
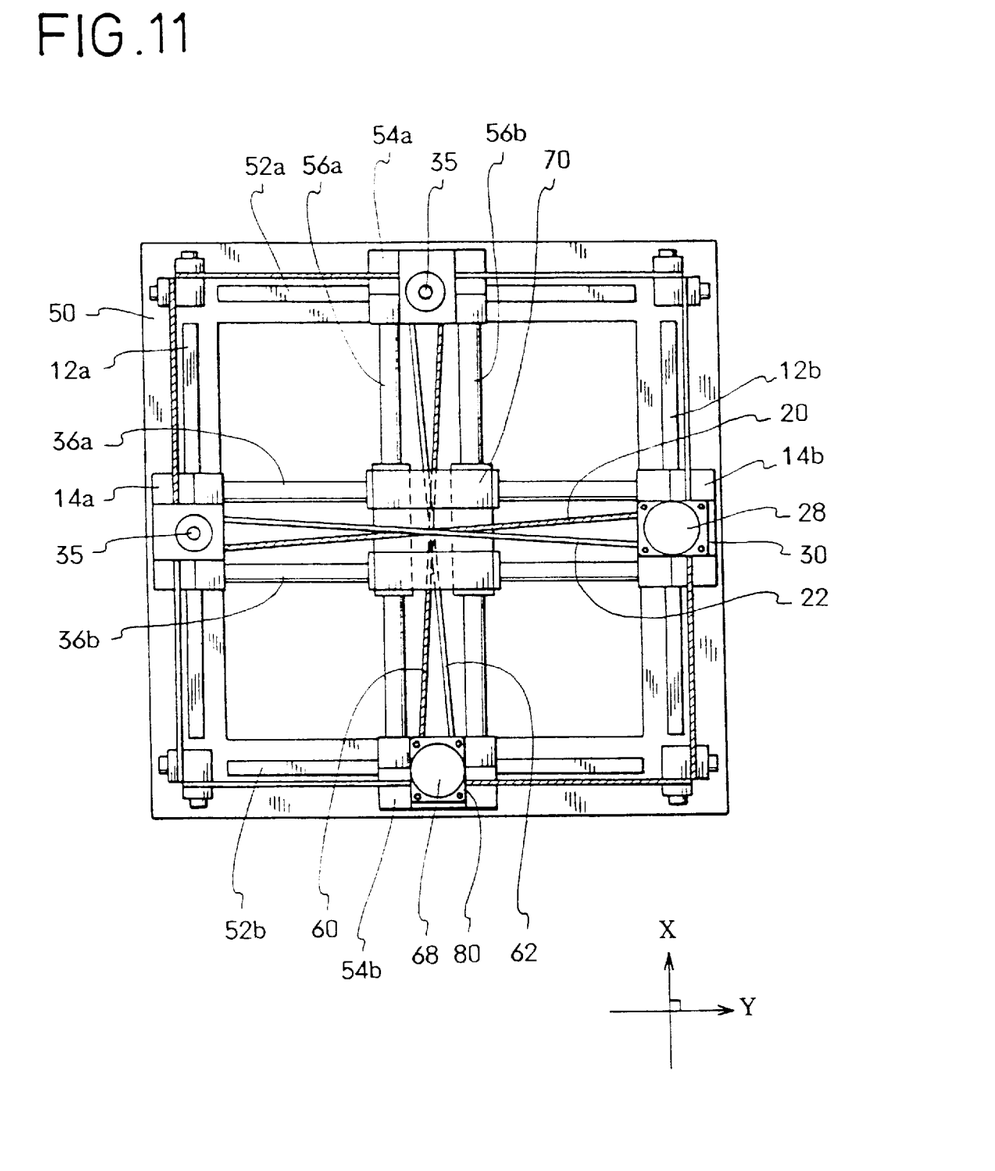
FIG. 11 is a plan view of the drive system of Sixth Embodiment.

Sixth Embodiment will be explained with reference to FIG. 11 (a plan view). In the Sixth Embodiment, the X- and the Y-drive units 11a and 11b, which have been explained in the Fourth Embodiment, is rotary drive units for directly rotating the pulleys, which are provided to the X- and the Y-travellers.

The X-drive unit of the Sixth Embodiment is the same as the X-drive unit of the Third Embodiment, so elements which have been explained in the Third Embodiment are assigned the same symbols, and explanation will be omitted.

In the X-drive unit, when the servo motor 28, which is an example of a first rotary drive unit, rotates the pulley 18 (see FIG. 8), the pulleys 18a and 18b (see FIG. 8) are rolled on the first belt 20 and the second belt 22. With this rolling, the X-travellers 14a and 14b can be synchronously moved, in the X-direction, alongside the X-guides 12a and 12b with high accuracy as well as the Third Embodiment.

The structure of the Y-drive unit is the same as that of the X-drive unit except the direction of arrangement, so its detail action is omitted.

A servo motor 68, which is an example of a second rotary drive unit of the Y-drive unit, is held by a supporting member 80, which is provided to the Y-traveller 54b. The servo motor 68 and the pulley 58b (see FIG. 8) are connected by a coupler. Note that, the pulley 58b and the servo motor 68 may be connected with a reduction gear mechanism.

When the pulley 58b (see FIG. 8) is rotated, the pulleys 58a and 58b are rolled on the first belt 20 and the second belt 22. With this rolling, the Y-travellers 54a and 54b can be synchronously moved, in the Y-direction, alongside the Y-guides 52a and 52b with high accuracy as well as the Fifth Embodiment.

The drive system of the present embodiment has effects, which are the same as the Fifth Embodiment, and the structure of the drive system can be simpler, so that the manufacturing cost thereof can be further reduced.

Figure 12:
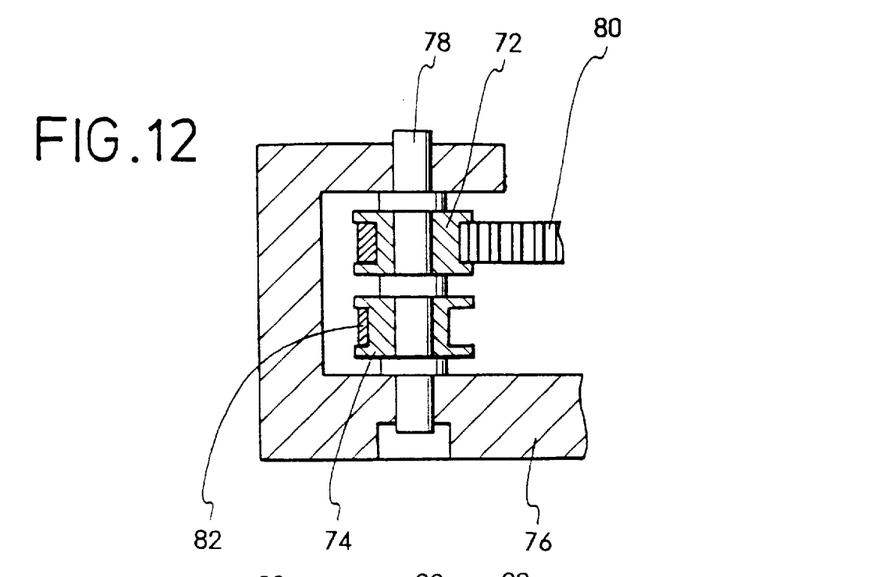
FIG. 12 is a sectional view of another example of the rotary guide.

Note that, in the First Embodiment to the Sixth Embodiment, the belts are used as the tension members. In the case of using timing belts as the tension members, phase of the timing belts sometimes shift each other. To remove the phase shift, as shown in FIG. 12, an upper part 72 and a lower part 74 of a double pulley are capable of independently rotating on a shaft 78 of the double pulley, which is fixed to a traveller 76. With this structure, proper tension can be applied to each timing belt 80 and 82. In the case of using chains as the tension members, a double sprocket, in which an upper part and a lower part are capable of independently rotating on a shaft of the double sprocket.

(Seventh Embodiment)

In the First Embodiment to the Sixth Embodiment, each structure in the X-direction and the Y-direction includes a pair of guides and a pair of travellers. But, the drive system of Seventh Embodiment include one guide and one traveller, and a posture of the traveller can be properly maintained while moving.

Figure 13:
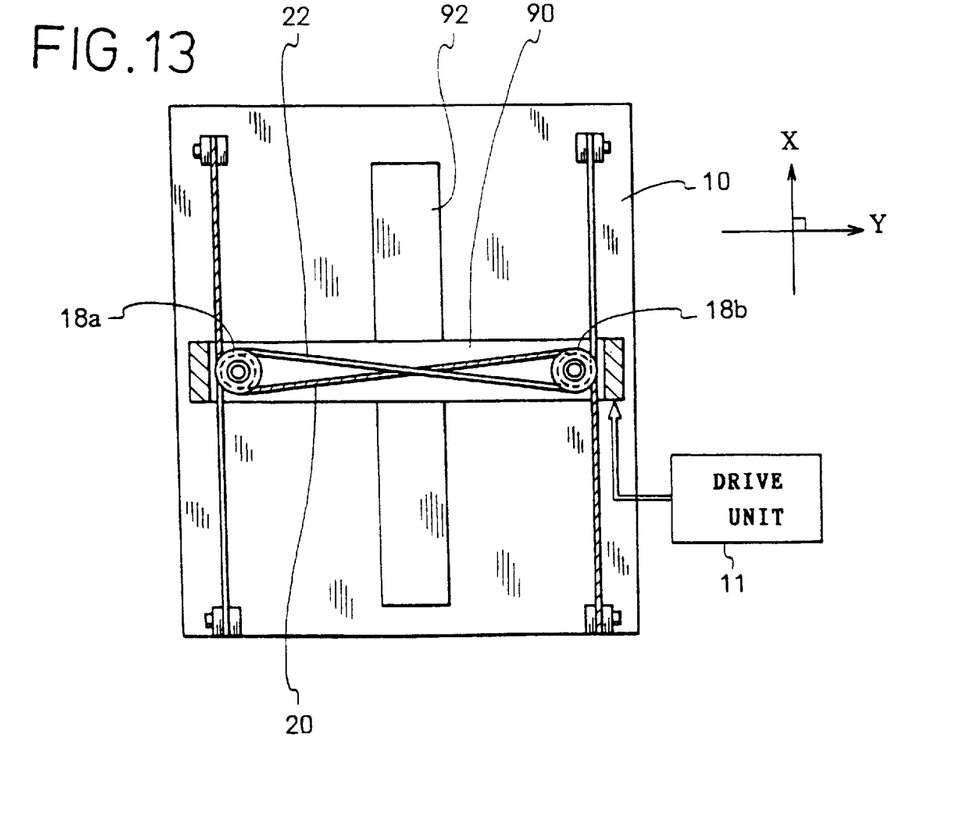
FIG. 13 is a plan view of the drive system of Seventh Embodiment.

The Seventh Embodiment will be explained with reference to FIG. 13 (a plan view). Note that, elements which have been explained in the foregoing embodiments are assigned the same symbols, and explanation will be omitted.

The posture of the traveller with respect to the guide 92 is maintained by the tension of the first belt 20 and the second belt 22. By maintaining the posture of the traveller, the traveller 90 can be always maintained its posture and smoothly moved along the guide 92, which is provided on the base 10, even if the weight load working to the traveller 90 is unbalanced.

(Eighth Embodiment)

Figure 14:
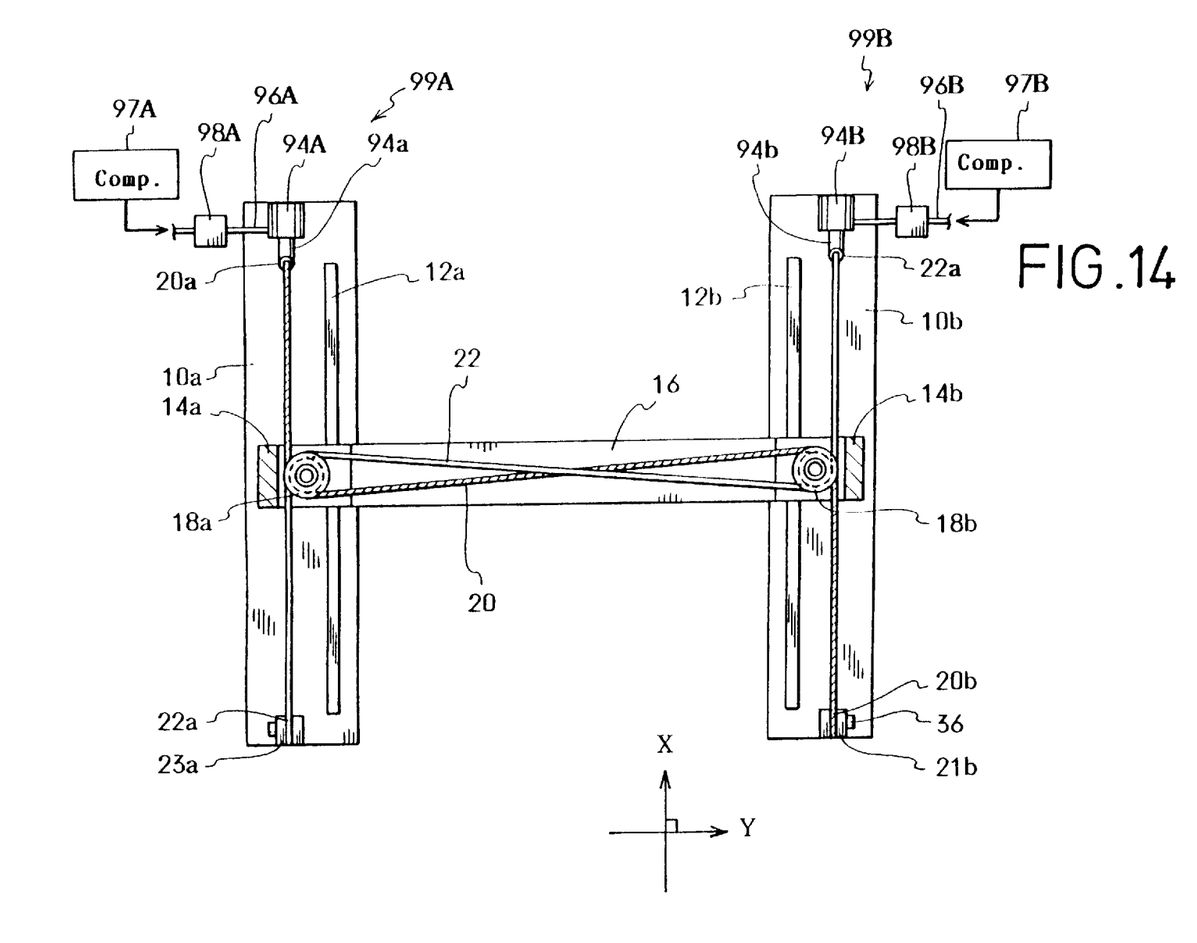
FIG. 14 is a plan view of the drive system of Eighth Embodiment.

Eighth Embodiment will be explained with reference to FIG. 14 (a plan view). Note that, the present embodiment is a modification of the First Embodiment, so elements which have been explained in the First Embodiment are assigned the same symbols, and explanation will be omitted.

The drive system of the present embodiment includes tension adjusting mechanisms 99A and 99b, which are capable of adjusting the tension of the first tension member and the second tension member respectively. Firstly, the tension adjusting mechanisms 99A and 99B will be explained.

A cylinder unit 94A is fixed at an end of the base 10a. The one end 20a of the first belt 20 is connected to a front end of a rod 94a, which is capable of extending and shortening, of the cylinder unit 94A. On the other hand, a cylinder unit 94B is fixed at an end of the base 10b. The one end 22a of the second belt 22 is connected to a front end of a rod 94b, which is capable of extending and shortening, of the cylinder unit 94B.

There is provided a regulator 98A in a mid way of an air path 96A, which introduces compressed air, which is an example of pressurized fluid, from a compressor 97A to the cylinder unit 94A. Similarly, there is provided a regulator 98B in a mid way of an air path 96B, which introduces compressed air from a compressor 97B to the cylinder unit 94B. In the present embodiment, the compressed air is used as the pressurized fluid, liquid and gas may be used instead of the compressed air. In the case of using liquid, e.g., oil, the liquid can be introduced into the cylinder units 94A and 94B by a pump. The regulators 98A and 98B adjust the pressure of the compressed air. The adjustment may be executed by a remote control means. By adjusting the air pressure with the regulators 98A and 98B, the tension of the first belt 20 and the second belt 22 can be adjusted.

In the present embodiment, the one end of each belt 20 and 22 is connected to the tension adjusting mechanism 99A and 99B, but both ends of each belt 20 and 22 may be connected to the tension adjusting mechanisms so as to precisely adjust the tension thereof.

Next, the action of the tension adjusting mechanisms 99A and 99B will be explained.

In a stage of initial setting of the drive system, the air pressure of the compressed air, which will be supplied to the cylinder units 94A and 94B, is adjusted by the regulators 98A and 98B. By the pressure adjustment, the tension of the first belt 20 and the second belt 22 can be adjusted. By properly adjusting the tension, the X-connecting member 16, which connects the X-travellers 14a and 14b, can be precisely set perpendicular to the X-guides 12a and 12b.

With the tension adjusting mechanisms 99A and 99B, the tension of the first belt 20 and the second belt 22 can be adjusted properly even if greater weight load works to one of the X-travellers 14a and 14b while operating the drive system.

According to conditions, e.g., the unbalanced weight load, the tension of the first belt 20 and the second belt 22 is sometimes required to set individually. In this case, the tension of each belt can be respectively adjusted by each tension adjusting mechanisms 99A and 99B.

When the movement of the X-travellers 14a and 14b and the X-connecting member 16 is stopped, the inertia thereof can be absorbed by increasing the tension of the first belt 20 and the second belt 22. By absorbing the inertia, vibration of the drive system can be restricted and the positioning accuracy of the movable members thereof can be high, even if the movable members are suddenly stopped.

In the present embodiment, the X-travellers 14a and 14b are connected by the X-connecting member 16, but the tension adjusting mechanism can be employed to the foregoing embodiments, too. For example, in the Fourth Embodiment (see FIG. 8), in which the moving body is capable of moving on the X-connecting member and the Y-connecting member, the tension adjusting mechanisms for the X-direction and the same for the Y-direction may be provided.

The tension adjusting mechanism is not limited to the above described mechanism, solenoids, screws, etc. may be employed instead of the cylinder units 94A and 94B.

In the First Embodiment to the Eighth Embodiment, the servo motors are used as driving sources of the drive units, but cylinder units, etc. may be used as the driving sources. Besides the ball bearing screw and the servo motor which directly rotates the rotary guide, lever-link mechanisms, etc. may be used as the drive unit.

In the First Embodiment to the Eighth Embodiment, the drive systems are operated in a horizontal plane, but the drive system of the present invention may be operated in a vertical plane and a diagonal plane, too, so the drive system can be applied to a precise robot, a vertical lift, etc..

The preferred embodiments of the present invention have been described, but the present invention is not limited to the above described embodiments, modifications are, of course, allowed without departing the spirit of the invention.

What is claimed is:

1. A drive system, comprising:
   a pair of guides being provided on a base, said guides being arranged in a first direction;
   a pair of travellers being capable of moving in the first direction alongside said guides;
   a first rotary guide being provided to one of said travellers;
   a second rotary guide being provided to the other traveller;
   a first tension member being tensionally engaged with said first rotary guide and said second rotary guide, one end section of said first tension member being extended from said first rotary guide and fixed to said base, the other end section thereof being extended from said second rotary guide in the opposite direction to the one end section and fixed to said base;

a second tension member being tensionally engaged with said first rotary guide and said second rotary guide, one end section of said second tension member being extended from said first rotary guide in the opposite direction to the one end section of said first tension member and fixed to said base, the other end section thereof being extended from said second rotary guide in the opposite direction to the one end section thereof and fixed to said base; and a drive unit for moving said travellers in the first direction.

2. The drive system according to claim 1, further comprising a connecting member mutually connecting said pair of guides.

3. The drive system according to claim 1, wherein said drive unit includes a ball bearing screw, which is screwed with one of said travellers.

4. The drive system according to claim 1, wherein said drive unit includes rotary driving means, which rotates one of said first rotary guide and said second rotary guide.

5. The drive system according to claim 1, wherein said first rotary gide and said second rotary guide are pulleys.

6. The drive system according to claim 1, wherein said first tension member and said second tension member are belts.

7. The drive system according to claim 4, wherein said rotary driving means is a motor.

8. The drive system according to claim 1, further comprising a tension adjusting mechanism for adjusting the tension of said first tension member and said second tension member.

9. A drive system, comprising:

a pair of first guides being provided on a base, said first guides being arranged in a first direction;

a pair of first travellers being capable of moving in the first direction alongside said first guides;

a first connecting member mutually connecting said pair of first travellers;

a first rotary guide being provided to one of said travellers;

a second rotary guide being provided to the other traveller;

a first tension member being tensionally engaged with said first rotary guide and said second rotary guide, one end section of said first tension member being extended from said first rotary guide and fixed to said base, the other end section thereof being extended from said second rotary guide in the opposite direction to the one end section and fixed to said base;

a second tension member being tensionally engaged with said first rotary guide and said second rotary guide, one end section of said second tension member being extended from said first rotary guide in the opposite direction to the one end section of said first tension member and fixed to said base, the other end section thereof being extended from said second rotary guide in the opposite direction to the one end section thereof and fixed to said base;

a first drive unit for moving said first travellers in the first direction;

a pair of second guides being provided on said base, said second guides being arranged in a second direction perpendicular to the first direction;

a pair of second travellers being capable of moving in the second direction alongside said second guides;

a second connecting member mutually connecting said pair of second travellers;

a third rotary guide being provided to one of said second travellers;

a fourth rotary guide being provided to the other second traveller;

a third tension member being tensionally engaged with said third rotary guide and said fourth rotary guide, one end section of said third tension member being extended from said third rotary guide and fixed to said base, the other end section thereof being extended from said fourth rotary guide in the opposite direction to the one end section and fixed to said base;

a fourth tension member being tensionally engaged with said third rotary guide and said fourth rotary guide, one end section of said fourth tension member being extended from said third rotary guide in the opposite direction to the one end section of said third tension member and fixed to said base, the other end section thereof being extended from said fourth rotary guide in the opposite direction to the one end section thereof and fixed to said base;

a second drive unit for moving said second travellers in the second direction; and a moving body being capable of moving on said first connecting member and said second connecting member.

10. The drive system according to claim 9, wherein said first drive unit includes a ball bearing screw, which is screwed with one of said first travellers, and wherein said second drive unit includes a ball bearing screw, which is screwed with one of said second travellers.

11. The drive system according to claim 9, wherein said first drive unit includes first rotary driving means, which rotates one of said first rotary guide and said second rotary guide, and wherein said second drive unit includes second rotary driving means, which rotates one of said third rotary guide and said fourth rotary guide.

12. The drive system according to claim 9, wherein said first rotary gide, said second rotary guide, said third rotary guide and said fourth rotary guide are pulleys.

13. The drive system according to claim 9, wherein said first tension member, said second tension member, said third tension member and said fourth tension member are belts.

14. The drive system according to claim 11, wherein said first rotary driving means and said second rotary driving means are motors.

15. A drive system, comprising:

a guide being provided on a base, said guide being arranged in a first direction;

an elongated traveller being arranged in a second direction perpendicular to the first direction, said traveller being capable of moving in the first direction alongside said guide;

a first rotary guide being provided to one part of said traveller;

a second rotary guide being provided to another part of said traveller;

a first tension member being tensionally engaged with said first rotary guide and said second rotary guide, one end section of said first tension member being extended from said first rotary guide and fixed to said base, the other end section thereof being extended from said second rotary guide in the opposite direction to the one end section and fixed to said base;

a second tension member being tensionally engaged with said first rotary guide and said second rotary guide, one end section of said second tension member being extended from said first rotary guide in the opposite direction to the one end section of said first tension member and fixed to said base, the other end section thereof being extended from said second rotary guide in the opposite direction to the one end section thereof and fixed to said base; and a drive unit for moving said traveller in the first direction.

16. The drive system according to claim 15, wherein said drive unit includes a ball bearing screw, which is screwed with said traveller.

17. The drive system according to claim 15, wherein said drive unit includes rotary driving means, which rotates one of said first rotary guide and said second rotary guide.

18. The drive system according to claim 15, wherein said first rotary gide and said second rotary guide are pulleys.

19. The drive system according to claim 15, wherein said first tension member and said second tension member are belts.

20. The drive system according to claim 17, wherein said rotary driving means is a motor.

* * * * *